(12) United States Patent
Uotani

(10) Patent No.: US 7,551,311 B2
(45) Date of Patent: Jun. 23, 2009

(54) IMAGE PROCESSING METHOD, IMAGE PROCESSING APPARATUS, PROGRAM, AND RECORDING MEDIUM FOR DISPLAYING DATA OF A RECORDING MEDIUM

(75) Inventor: Kenichiro Uotani, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 939 days.

(21) Appl. No.: 10/648,221

(22) Filed: Aug. 27, 2003

(65) Prior Publication Data

US 2004/0088654 A1    May 6, 2004

(30) Foreign Application Priority Data

Aug. 29, 2002   (JP)   ............................. 2002-251713
Aug. 25, 2003   (JP)   ............................. 2003-300392

(51) Int. Cl.
*G06K 15/02*   (2006.01)
*G09G 5/00*    (2006.01)

(52) U.S. Cl. ...................................... 358/1.18; 345/1.1

(58) Field of Classification Search ................. 358/1.1, 358/1.7, 1.9, 3.29, 3.32, 1.15, 1.17, 1.18, 358/448; 345/642, 530, 531, 553, 204, 1.1, 345/2.3, 3
See application file for complete search history.

(56) References Cited

U.S. PATENT DOCUMENTS

| 6,313,923 | B1 | 11/2001 | Takanashi et al. |
| 6,903,760 | B2 * | 6/2005 | McFarland et al. ........... 347/225 |
| 2001/0026531 | A1 * | 10/2001 | Onodera et al. ............. 369/284 |
| 2002/0191517 | A1 * | 12/2002 | Honda et al. ............. 369/53.29 |
| 2004/0141791 | A1 * | 7/2004 | Obara ...................... 400/615.2 |
| 2004/0227976 | A1 | 11/2004 | Pavlov et al. |
| 2005/0281182 | A1 * | 12/2005 | Honda et al. ............. 369/275.1 |

FOREIGN PATENT DOCUMENTS

| JP | 06-030982 U | 4/1994 |
| JP | 11-191841 A | 7/1999 |
| JP | 2000-123008 A | 4/2000 |
| JP | 2001-315226 A | 11/2001 |

* cited by examiner

*Primary Examiner*—Gabriel I Garcia
(74) *Attorney, Agent, or Firm*—Fitzpatrick, Cella, Harper & Scinto

(57) ABSTRACT

An image processing method which is used to confirm a layout when an image is formed onto a recording medium on the basis of an application. The method includes: an image forming step of forming the image based on the application; and a display control step of controlling a process for displaying the image so that a portion corresponding to the inside of the recording medium of the image formed in the image forming step and a portion corresponding to the outside of the recording medium can be discriminated.

13 Claims, 15 Drawing Sheets

FIG. 12

| MODEL NO. | MANUFACTURER'S NAME | SIZE | LABEL AREA | SURFACE TEXTURE | PRINTING METHOD |
|---|---|---|---|---|---|
| AAA00001 (1201) | A COMPANY (1202) | 12cm (1203) | OUTER: 5.75cm<br>INNER: 2.1cm<br>(1204) (1205) | ABSORBANCE: HIGH<br>GLOSSINESS: HIGH<br>(1206) | DENSITY: DENSE<br>QUALITY: HIGH QUALITY<br>(1207) |
| AAA00002 | A COMPANY | 8cm | OUTER: 3.8cm<br>INNER: 2.1cm | ABSORBANCE: HIGH<br>GLOSSINESS: HIGH | DENSITY: DENSE<br>QUALITY: HIGH QUALITY |
| BBBBBB0001 | B COMPANY | 12cm | OUTER: 5.75cm<br>INNER: 2.1cm | ABSORBANCE: LOW<br>GLOSSINESS: HIGH | DENSITY: LIGHT<br>QUALITY: STANDARD QUALITY |
| CC0000001 | C COMPANY | 12cm | OUTER: 5.8cm<br>INNER: 2.2cm | ABSORBANCE: HIGH<br>GLOSSINESS: LOW | DENSITY: DENSE<br>QUALITY: STANDARD QUALITY |
| CC0000002 | C COMPANY | 12cm | OUTER: 5.8cm<br>INNER: 2.15cm | ABSORBANCE: LOW<br>GLOSSINESS: LOW | DENSITY: LIGHT<br>QUALITY: LOW QUALITY |
| CC0000003 | C COMPANY | 8cm | OUTER: 3.75cm<br>INNER: 2.15cm | ABSORBANCE: HIGH<br>GLOSSINESS: HIGH | DENSITY: DENSE<br>QUALITY: HIGH QUALITY |
| DDDDD01 | D COMPANY | 12cm | OUTER: 5.8cm<br>INNER: 2.0cm | ABSORBANCE: HIGH<br>GLOSSINESS: LOW | DENSITY: DENSE<br>QUALITY: STANDARD QUALITY |

IMAGE PROCESSING METHOD, IMAGE PROCESSING APPARATUS, PROGRAM, AND RECORDING MEDIUM FOR DISPLAYING DATA OF A RECORDING MEDIUM

BACKGROUND OF THE INVENTION

1. Field of the Invention

The invention relates to an image processing method, an image processing apparatus, a program, and a recording medium, by which, for example, before print data is actually print-outputted, a print preview of the print data is displayed.

2. Related Background Art

Hitherto, for example, in an information processing apparatus such as a personal computer or the like, in the case where print data such as document, image, or the like edited by an application for document editing or image editing is print-outputted onto a sheet by a printing apparatus, a print preview for previously displaying a print result by an analysis or the like of the print data is executed before a print output executing command is transmitted to the printing apparatus.

However, in the conventional print preview, there is a problem such that when image data is arranged out of a printable area, a lack is caused in a printed image, or an image is forcedly reduced so as not to cause a lack in the print result, so that an unexpected layout is obtained.

In the application, for example, since it is impossible to edit the print data on the basis of the sheet of the same size as that of a CD-R media as an example of recording media, the print data is edited on the basis of the sheet selected by the application irrespective of whether the print data is print-outputted to the CD-R media or not. Therefore, in the print preview which is displayed in the case of print-outputting the print data to the CD-R media, contents which would be outputted onto the sheet selected by the application are displayed.

In the case of actually print-outputting the print data to the CD-R media by the printing apparatus, it is necessary to set the CD-R media onto a dedicated tray or the like and, thereafter, set the tray into the printing apparatus instead of directly setting the CD-R media into the printing apparatus.

In the case of print-outputting the print data to the CD-R media, a media to which the print data is actually print-outputted is not the sheet selected by the application but the CD-R media (accurately, the dedicated tray set into the printing apparatus). However, in the conventional print system including the displaying method of the print preview as mentioned above, although the contents which would be outputted onto the sheet selected by the application can be confirmed by the print preview before the print data is print-outputted onto the CD-R media, contents which would be outputted onto the CD-R media set onto the dedicated tray cannot be accurately confirmed. Therefore, in the case where the print data is directly print-outputted, there is a risk such that the print data is outputted so as to overflow the CD-R media and the dedicated tray is dirtied.

SUMMARY OF THE INVENTION

The invention is made in consideration of the above problems and it is an aspect of the invention to provide an image processing method, an image processing apparatus, a program, and a recording medium, by which an image which is printed onto a recording medium (for example, a CD-R media) so as to overflow it can be previously grasped.

To accomplish the above aspect, according to the first aspect of the invention, there is provided an image processing method which is used to confirm a layout when an image is formed onto a recording medium on the basis of an application, comprising: an image forming step of forming the image based on the application; and a display control step of controlling a process for displaying the image so that a portion corresponding to the inside of the recording medium of the image formed in the image forming step and a portion corresponding to the outside of the recording medium can be discriminated.

Other features and advantages of the present invention will be apparent from the following description taken in conjunction with the accompanying drawings, in which like reference characters designate the same or similar parts throughout the FIGURES thereof.

BRIEF DESCRIPTION OF THE DRAWINGS

FIG. 12 is a diagram showing an example of a model number information table held in the previewer;

DETAILED DESCRIPTION OF THE PREFERRED EMBODIMENTS

Embodiments of the invention will be described in detail hereinbelow with reference to the drawings.

(First Embodiment)

Figure 1:
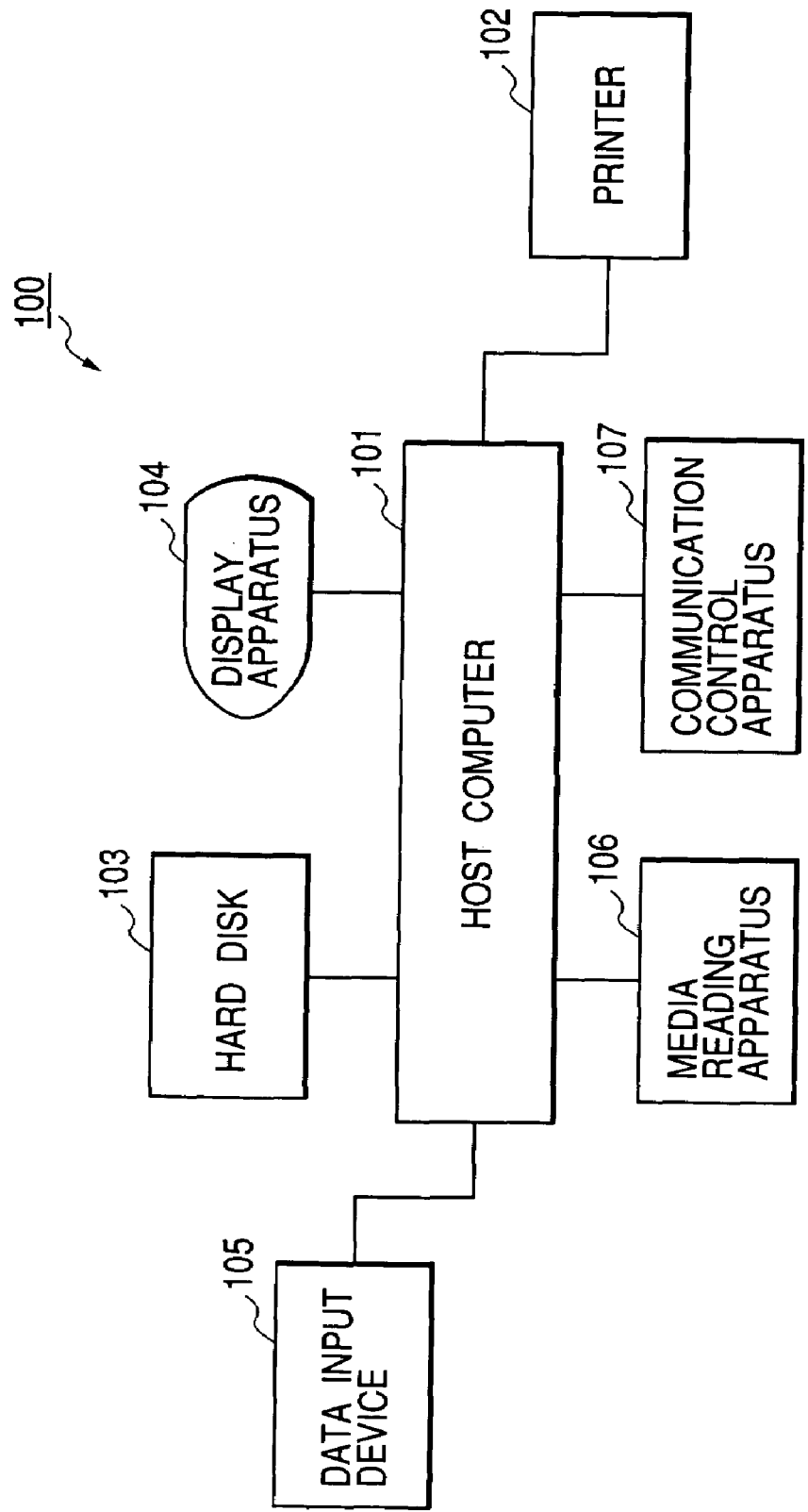
FIG. 1 is a block diagram showing a schematic construction of a print system according to an embodiment of the invention.

First, a construction of a print system according to an embodiment will be schematically explained. FIG. 1 is a block diagram showing the schematic construction of the print system according to the embodiment.

A print system 100 according to the embodiment displays a print preview by a display apparatus 104 before print data such as document, image, or the like formed by an application which can be activated by a personal computer or the like as a preferred embodiment of an image processing apparatus of the invention is print-outputted onto a sheet by a printing apparatus (or a printer) 102. Usually, the image processing apparatus is not limited to the foregoing personal computer but can be a workstation or the like and, further, includes a copying apparatus, a printer (not shown), or the like having a display unit which enables a preview. Further, the print system is constructed in a manner such that in the case of print-outputting onto a CD-R media, not only contents which would be outputted onto the sheet selected by the application but also a portion to be actually outputted onto the CD-R media, that is, a portion corresponding to the inside of the CD-R media and a portion which is outputted to the CD-R media so as to overflow it, that is, a portion corresponding to the outside of the CD-R media are displayed so that they can be visually discriminated. Thus, a print preview function of better use convenience can be provided.

The construction and the operation of the print system 100 according to the embodiment will be specifically explained.

<Whole Construction of the Print System 100>

As shown in FIG. 1, the print system 100 has a construction such that the printer 102, a hard disk apparatus 103, the display apparatus 104, a data input device 105, a media reading apparatus 106, and a communication control apparatus 107 are connected to a host computer 101, respectively.

The host computer 101 executes a predetermined system program, thereby controlling and monitoring the whole operation of the print system 100. Specifically speaking, for example, the host computer 101 has computer functions including a CPU (Central Processing Unit), a RAM (Random Access Memory), a ROM (Read Only Memory), and the like arranged on a system board as will be explained hereinlater. The CPU properly reads out a desired processing program from a built-in memory, the hard disk 103 externally attached, or the like and executes it, thereby controlling the whole operation of the print system 100.

For example, a storing destination of various programs which are executed by the host computer 101 is assumed to be the hard disk 103. A processing program to realize the operation in the embodiment, various applications to form the print data, and the like have been stored in the hard disk 103.

The storing destination of the processing program (program codes) to realize the operation in the embodiment is not limited to the hard disk 103 or the built-in memory. For example, it is also possible that the processing program is recorded into a portable recording medium such as CD-ROM, flexible disk, or the like in a form in which it can be read out by the host computer 101, the recording medium is circulated, when the print system 100 is constructed, the host computer 101 reads out the processing program via the media reading apparatus 106 or the communication control apparatus 107 and installs it onto the hard disk 103.

Although, for example, "Windows (registered trademark)" is used as an OS (Operating System) of the host computer 101 in the embodiment, the invention is not limited to it.

When the printer 102 receives information such as print conditions or the like together with the print data from the host computer 101, it print-outputs (an image is formed) the print data onto a print sheet by executing a predetermined printing process. For example, various printers such as serial printer, page printer, other printers of an electronic copying type, and the like can be applied as a printer 102. Also with respect to a connecting form of the printer 102 and the host computer 101, for example, various connecting forms such as stand-alone connection, network connection, and the like can be applied.

The display apparatus 104 displays a predetermined dialog window in response to an instruction according to the execution of the system program, application, or the like from the host computer 101. Particularly, the display apparatus 104 displays a print preview as a feature of the embodiment, which will be explained in detail hereinlater, in accordance with the instruction from the host computer 101.

The data input device 105 includes a keyboard, a mouse, other pointing devices, and the like receives various instructions from the user, and notifies the host computer 101 of them. For example, the data input device 105 notifies the host computer 101 of print conditions for the printer 102 and display conditions of the print preview (hereinafter, referred to as "preview display conditions") which were inputted from the user.

The media reading apparatus 106 is an apparatus including a CD-ROM drive, a flexible disk (FD) drive, and the like and supplies information read out from the recording medium such as CD-ROM, FD, or the like to the host computer 101. The communication control apparatus 107 is a connecting interface for connecting, for example, the print system 100 and an external network so that they can communicate with each other.

<Functional Construction of the Print System 100>

Figure 2:
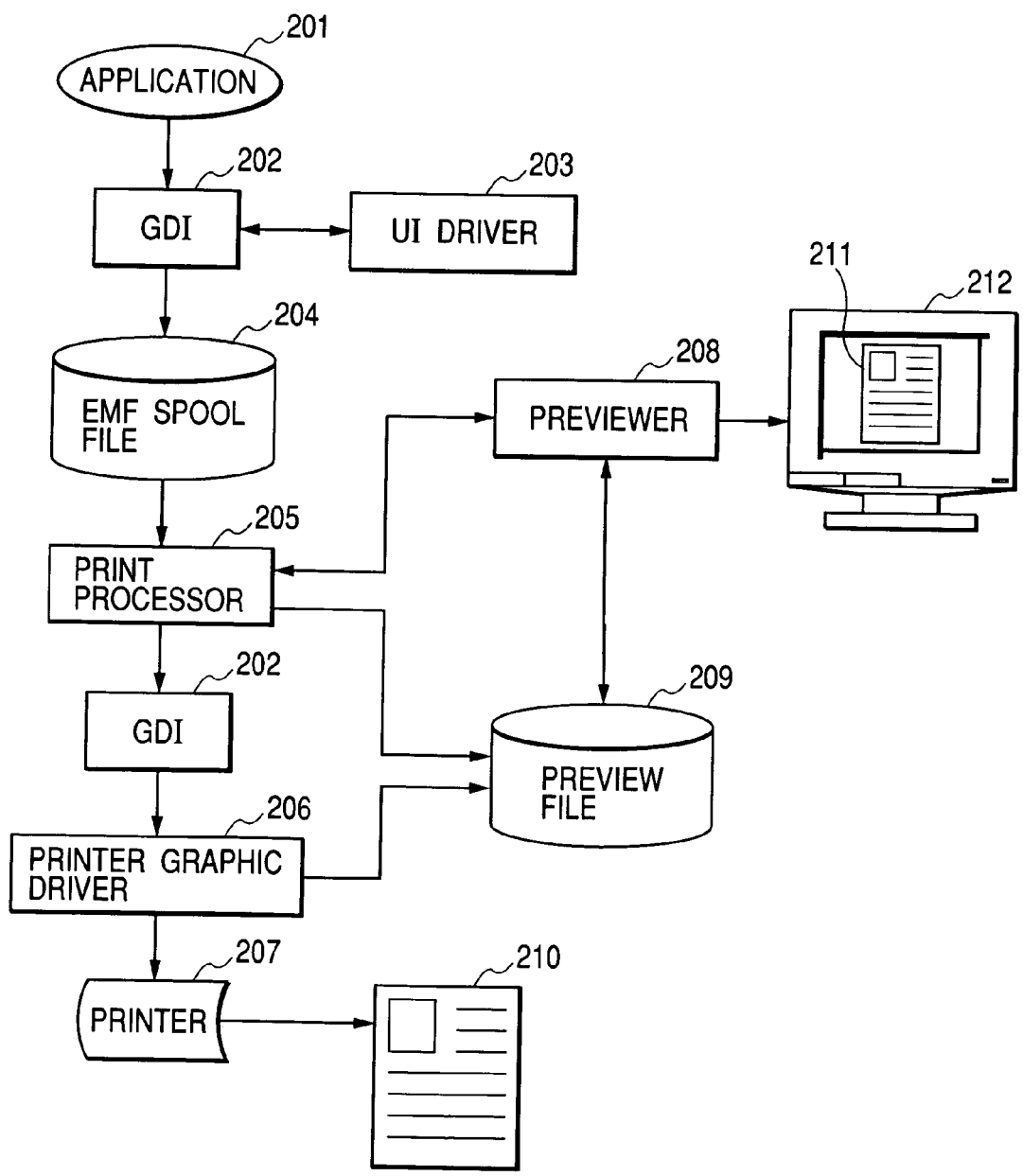
FIG. 2 is a functional constructional diagram in the case where attention is paid to, particularly, a print control function in the print system according to the embodiment of the invention which is realized when a host computer executes a predetermined processing program.

FIG. 2 is a functional constructional diagram in the case where attention is paid to, particularly, the print control function among the functions of the print system 100 which are realized when the host computer 101 executes a predetermined processing program.

As shown in FIG. 2, the print control function by the host computer 101 includes: an application 201; a GDI (Graphics Device Interface) 202; a user interface (UI) driver 203; an EMF spool file 204; a print processor 205; a printer graphics driver 206; a previewer 208; and a preview file 209.

First, the main functions included in the print control function by the host computer 101 will be described.

The user interface driver 203 has a function for setting the print conditions into the printing apparatus (or a printer) 102 via the GDI 202. Specifically speaking, for example, the UI driver 203 has a function for setting a size of sheet and a media which are used for printing and other print conditions and has a function for setting whether the print preview is displayed by the display apparatus 104 before the printing is executed or not. It is now assumed that a mode in which the print preview is displayed by the display apparatus 104 before the printing is executed has been set by the UI driver 203.

The print processor 205 has a function for processing page by page the print data stored in the spool file 204 and a function for activating the previewer 208. The printer graphics driver 206 has a function for converting the print data into bit map data which can be print-outputted by the printer 102. The previewer 208 has a function for displaying print preview data (preview image data) 211 stored in the preview file 209 by the display apparatus 104. The preview file 209 is a file which is temporarily formed when the print preview is displayed by the display apparatus 104 and includes the print preview data (preview image data), print condition information, preview display condition information, and the like.

Subsequently, a series of operations of the print control function by the host computer 101 will be explained.

First, the application 201 forms an arbitrary document in accordance with an operating instruction from the user and instructs the execution of the printing of the document data (print data). Thus, the GDI 202 notifies the UI driver 203 of an event of print start.

Subsequently, the application 201 stores the document data (print data) into the EMF spool file 204 via the GDI 202. At this time, the print condition information in the printer 102 has previously been stored in the EMF spool file 204 by the UI driver 203.

The print processor 205 obtains the print condition information and the print data from the EMF spool file 204, supplies the print condition information and the print data to the printer graphics driver 206 page by page, and activates the previewer 208. By communicating with the previewer 208, the print processor 205 obtains the preview display conditions such as numbers of the pages whose print preview is displayed by the display apparatus 104 and resolution and the like of a preview image which is used for displaying the print preview.

The print processor 205 obtains the print conditions corresponding to the obtained page number from the EMF spool file 204 and stores them into the preview file 209. Further, the print processor 205 notifies the printer graphics driver 206 of a file name of the preview file 209 (hereinafter, referred to as a "preview file name"), the obtained print conditions, and the preview display conditions via the GDI 202. Thereafter, the print processor 205 obtains the print data from the EMF spool file 204, forms print data corresponding to the obtained page number (hereinafter, referred to as "print page data") from the obtained print data, and supplies the formed print data to the GDI 202.

The printer graphics driver 206 forms bit map data for display of the print preview (hereinafter, referred to as "preview image data") or bit map data for printing (hereinafter, referred to as "print image data") from the print page data supplied from the print processor 205 on the basis of a graphics drawing command formed by the GDI 202 and the print conditions and preview display conditions previously notified by the print processor 205.

At this time, when the print image data is formed by the printer graphics driver 206, the printer graphics driver 206 supplies the print image data to the printer 102 via an arbitrary data transmitting unit (not shown). The printer 102 print-outputs the print image data supplied from the printer graphics driver 206 onto a sheet (210).

When the preview image data is formed by the printer graphics driver 206, the printer graphics driver 206 stores the preview image data into the preview file 209 on the basis of the preview file name previously notified by the print processor 205. The print processor 205 notifies the previewer 208 of the preview file name.

The previewer 208 receives the setting of the preview display conditions from the user and requests the print processor 205 to form the preview file 209 suitable for the set preview display conditions. When the previewer 208 receives the notification of the preview file name of the preview file 209 from the print processor 205, the previewer 208 obtains the preview image data from the preview file 209 and displays the print preview (211) based on the preview image data by the display apparatus 104 on the basis of the set preview display conditions.

<Print Preview Display Screen>

Figure 3:
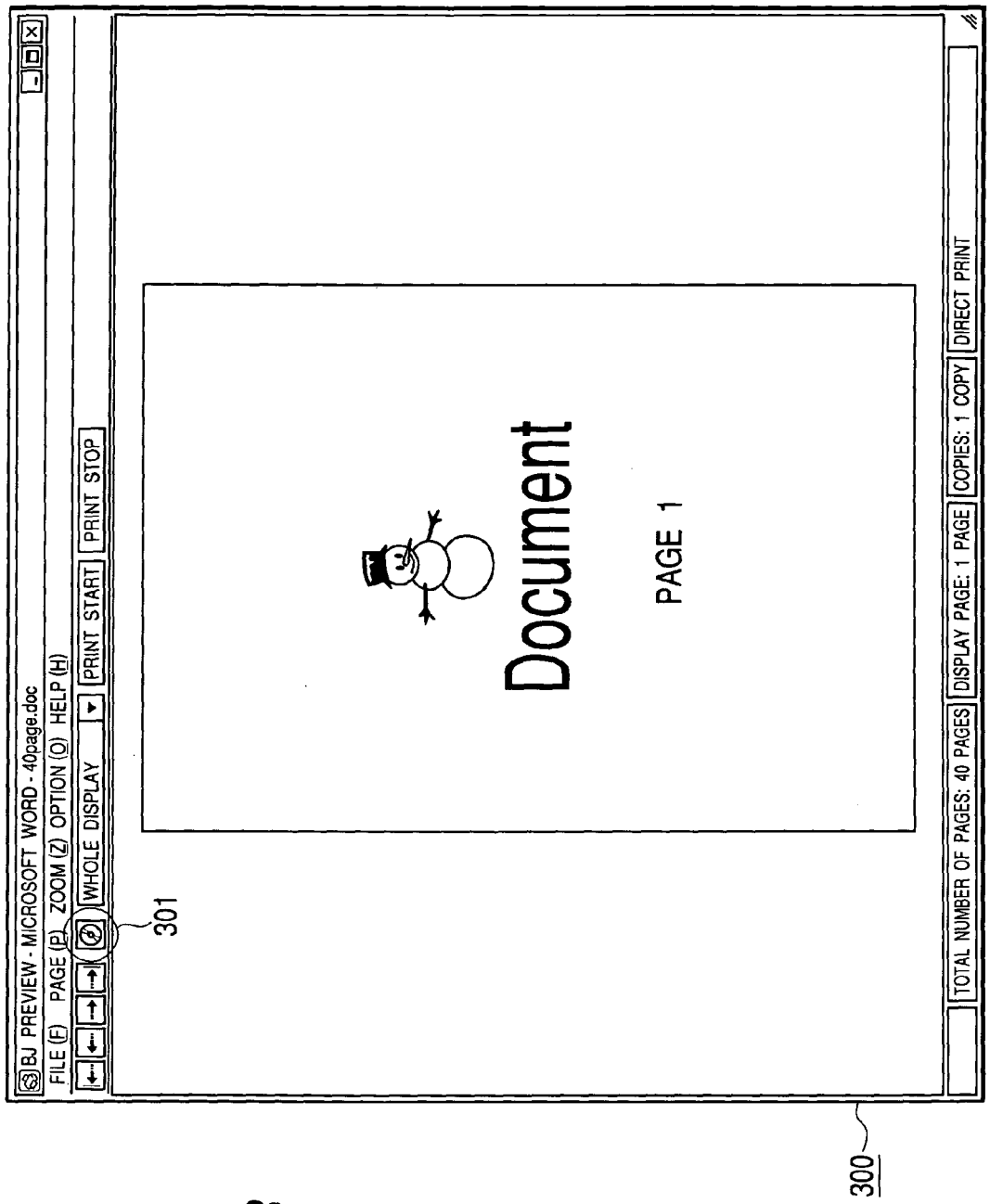
FIG. 3 is a diagram showing an example of a print preview display screen which is displayed by a display apparatus in the case of print-outputting onto a media other than a CD-R media.
Figure 4:
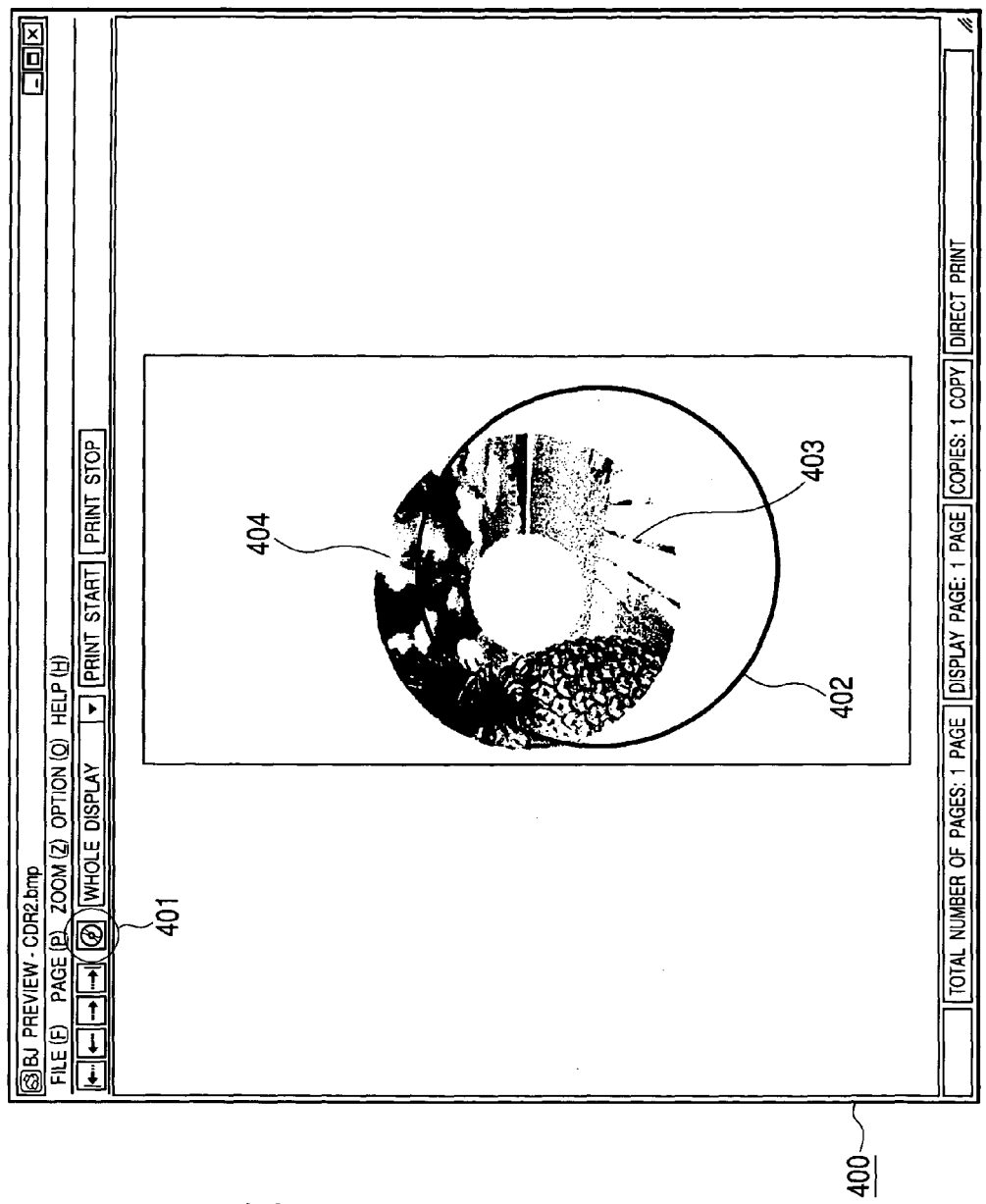
FIG. 4 is a diagram showing an example of a print preview display screen for the CD-R media which is displayed by the display apparatus in the case of print-outputting onto the CD-R media.
Figure 5:
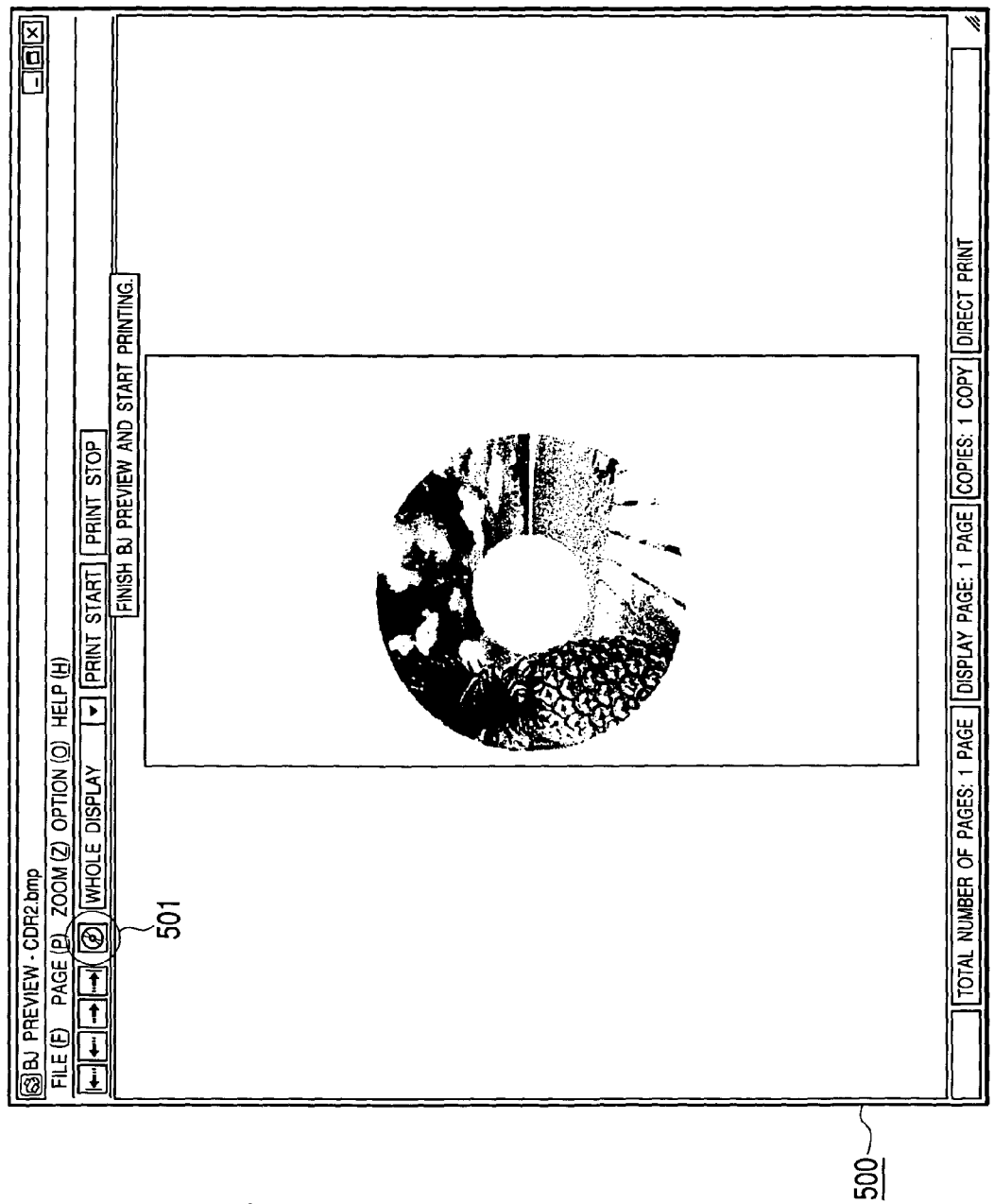
FIG. 5 is a diagram showing an example of a print preview display screen which is displayed by the display apparatus in the case of print-outputting onto the CD-R media.

FIGS. 3 to 5 show examples of display screens 300 to 500 of the print preview (211) displayed by the display apparatus 104 by the previewer 208.

FIG. 3 is a diagram showing the example of the print preview display screen 300 in the document formed by the application 201 in the case of print-outputting onto a media other than the CD-R media.

On the display screen 300 of FIG. 3, reference numeral "301" denotes an item column for allowing the user to select whether the print preview for the CD-R media is displayed or not. As shown in FIG. 3, in the case of print-outputting onto a media other than the CD-R media, "301" is invalid to prevent the user from selecting it.

FIG. 4 is a diagram showing the example of the print preview display screen 400 for the CD-R media in the document formed by the application 201 in the case of print-outputting onto the CD-R media.

On the display screen 400 of FIG. 4, reference numeral "401" denotes an item column for allowing the user to select whether the print preview for the CD-R media is displayed or not. As shown in FIG. 4, "401" is clicked in the case of print-outputting onto the CD-R media and in the case of displaying the print preview for the CD-R media.

Reference numeral "402" denotes a range which would be actually outputted onto the CD-R media.

Reference numeral "403" denotes contents which would be actually outputted onto the CD-R media.

Reference numeral "404" denotes contents which would be actually outputted to the CD-R media so as to overflow it.

FIG. 5 is a diagram showing the example of the print preview display screen 500 in the document formed by the application 201 in the case of print-outputting onto the CD-R media.

On the display screen 500 of FIG. 5, reference numeral "501" denotes an item column for allowing the user to select whether the print preview for the CD-R media is displayed or not. As shown in FIG. 5, "501" is not clicked in the case of print-outputting onto the CD-R media and in the case where the print preview for the CD-R media is not displayed.

<Display of Print Preview by the Previewer 208>

Figure 6:
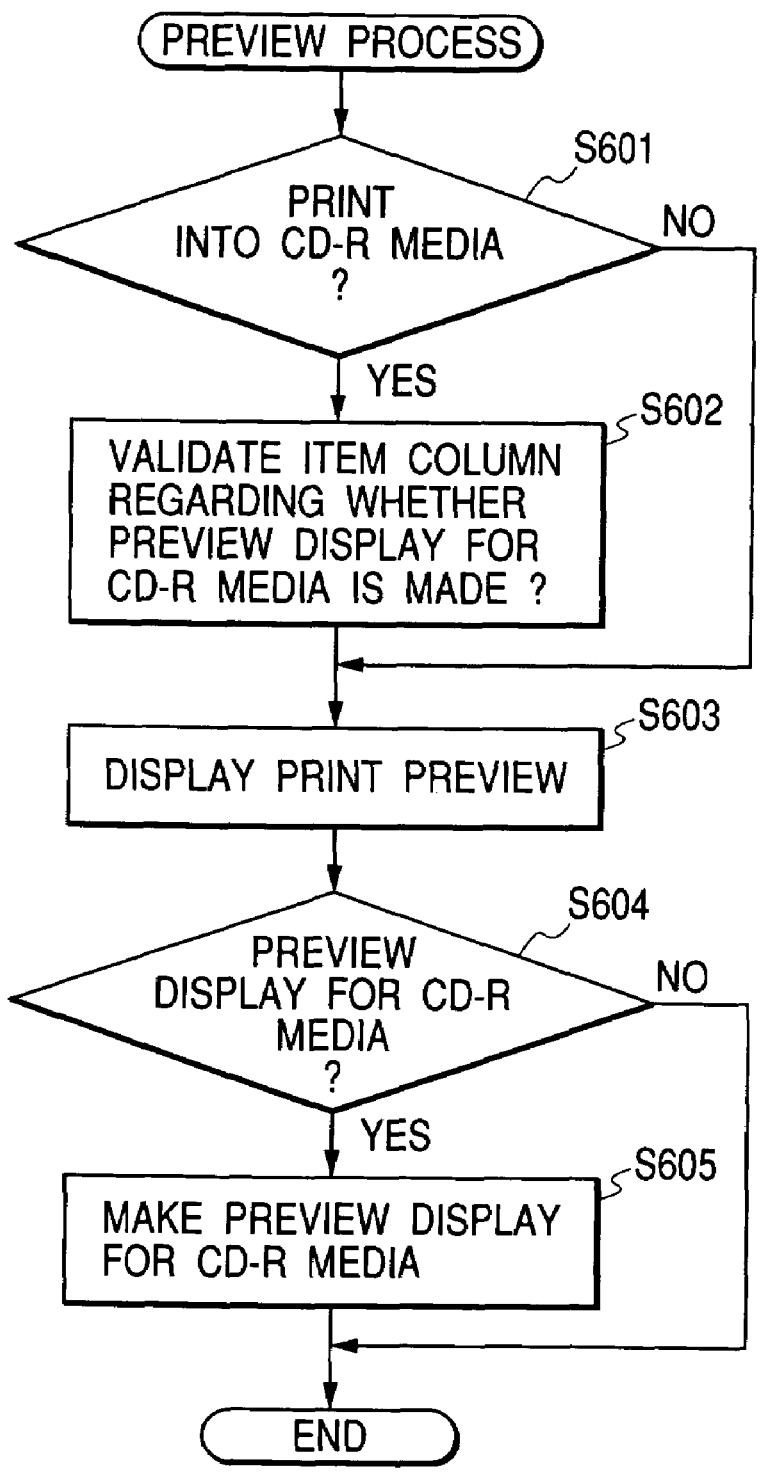
FIG. 6 is a flowchart showing the operation which is executed when a previewer displays the print preview according to the first embodiment of the invention.

FIG. 6 is a flowchart showing the operation which is executed when the previewer 208 displays the print preview.

Attention is paid to a process in which the previewer 208 discriminates the displaying method of the display screens 300 to 500 shown in FIGS. 3 to 5.

Step S601:

The previewer 208 discriminates whether the print data is printed to the CD-R media or not from the print condition information stored in the preview file 209. That is, whether a first mode of forming the image onto a recording medium such as a rectangular sheet or the like matched with a layout (for example, A4 size, B5 size, etc.) corresponding to the general application has been set or a second mode of forming the image onto, for example, a disk-shaped recording medium such as a CD-R or the like which is not matched with the layout corresponding to the general application has been set is discriminated from the print condition information. If it is determined as a discrimination result that the second mode has been set and in the case of printing the print data to, for example, the CD-R media, step S602 follows. In the case of printing to a media other than the CD-R media, step S603 follows.

Step S602:

In the case of printing to the CD-R media as a discrimination result of step S601, the previewer 208 validates the item column for allowing the user to select whether the print preview for the CD-R media is displayed or not (refer to "401" in FIG. 4).

Step S603:

The previewer 208 displays the preview image by the display apparatus 104. Thus, a state of the display screen 300 in FIG. 3 or the display screen 500 in FIG. 5 is obtained.

Step S604:

The previewer 208 discriminates whether the print preview for the CD-R media is displayed or not from the state of the item column for allowing the user to select whether the image formed in the second mode is displayed as a print preview for the CD-R media or not. As a discrimination result, if the print preview for the CD-R media is displayed, step S605 follows. If the print preview for the CD-R media is not displayed, the present processing routine is finished.

Step S605:

In the case of displaying the print preview for the CD-R media as a result of the discrimination in step S604, the previewer 208 displays the print preview for the CD-R media onto the display apparatus 104, so that a state of the display screen 400 in FIG. 4 is obtained. The present processing routine is finished.

(Second Embodiment)

The first embodiment is constructed in a manner such that in the case of print-outputting to the CD-R media, the previewer 208 can discriminate a difference between the portion to be actually outputted onto the CD-R media, that is, the portion corresponding to the inside of the CD-R media and the portion which is outputted to the CD-R media so as to overflow it, that is, the portion corresponding to the outside of the CD-R media.

However, with respect to the CD-R-media, there are two kinds of CD-R media of the CD-R media having a diameter of 8 cm and the CD-R media having a diameter of 12 cm as commercially available CD-R media in general.

The second embodiment is, therefore, characterized in that in the case of displaying the print preview for the CD-R media by the previewer 208, the user is allowed to select either the mode of displaying the print preview for the CD-R media having the diameter of 8 cm or the mode of displaying the print preview for the CD-R media having the diameter of 12 cm, thereby switching the range of the portion corresponding to the inside of the CD-R media and the range of the portion which is outputted to the CD-R media so as to overflow it.

Figure 7:
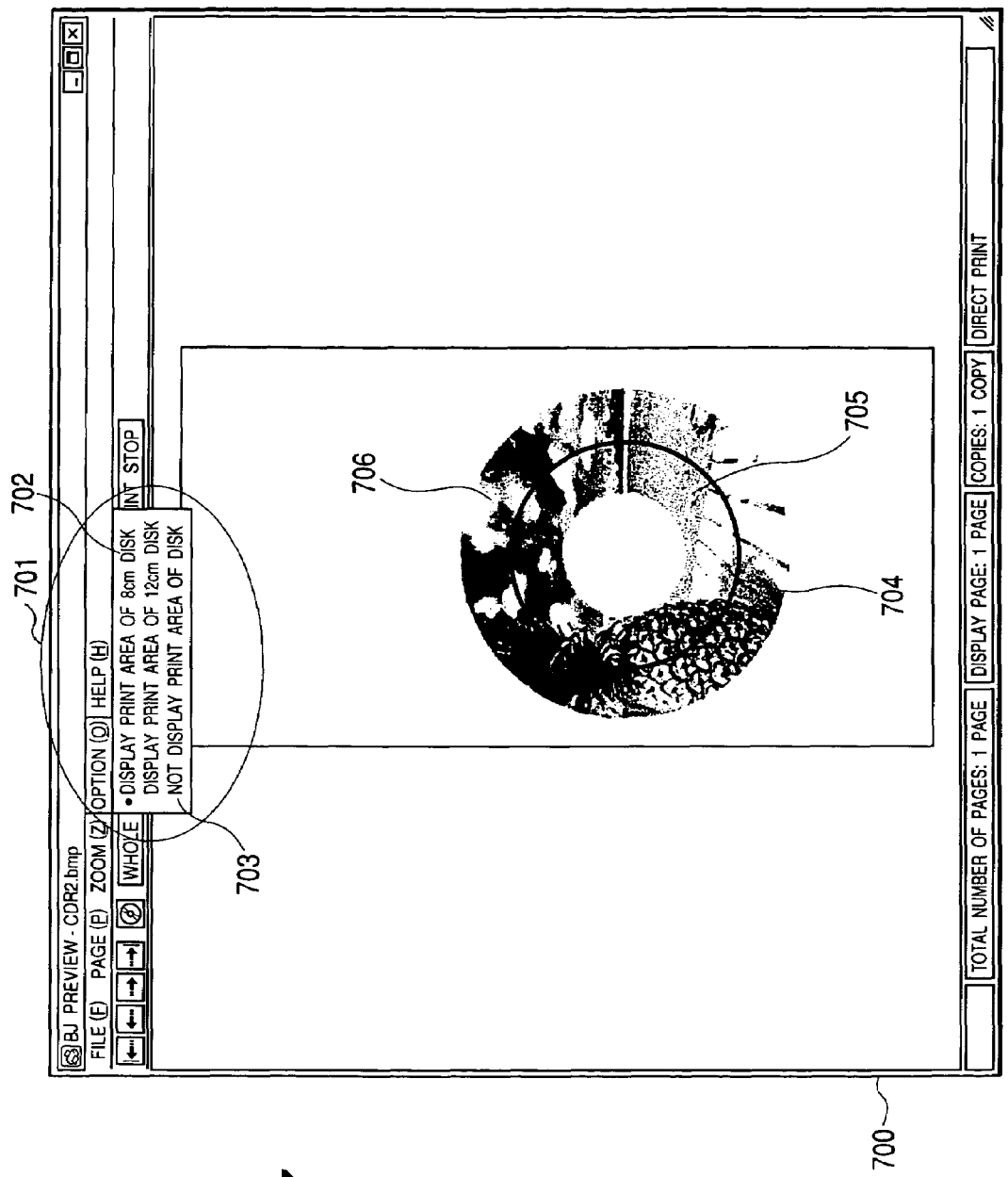
FIG. 7 is a diagram showing an example of a print preview display screen for a CD-R media of 8 cm which is displayed by the display apparatus in the case of print-outputting onto the CD-R media.

FIG. 7 is a diagram showing an example of a print preview display screen 700 for the CD-R media of 8 cm in the document formed by the application 201 in the case of print-outputting onto the CD-R media.

On the display screen 700 of FIG. 7, reference numeral "701" denotes an item column for allowing the user to select one of the mode in which the print preview for the CD-R media of 8 cm is displayed, the mode in which the print preview for the CD-R media of 12 cm is displayed, and the mode in which the print preview for the CD-R media is not displayed.

As shown in FIG. 7, "702" is selected in the case of print-outputting onto the CD-R media and in the case of displaying the print preview for the CD-R media of 8 cm.

When the print preview for the CD-R media is not displayed, that is, in the case of the state where "501" is not clicked on the display screen 500 of FIG. 5, "703" is selected.

Reference numeral "704" denotes a range which would be actually outputted onto the CD-R media of 8 cm.

Reference numeral "705" denotes contents which would be actually outputted onto the CD-R media of 8 cm.

Reference numeral "706" denotes contents which would actually be outputted to the CD-R media of 8 cm so as to overflow it.

Figure 8:
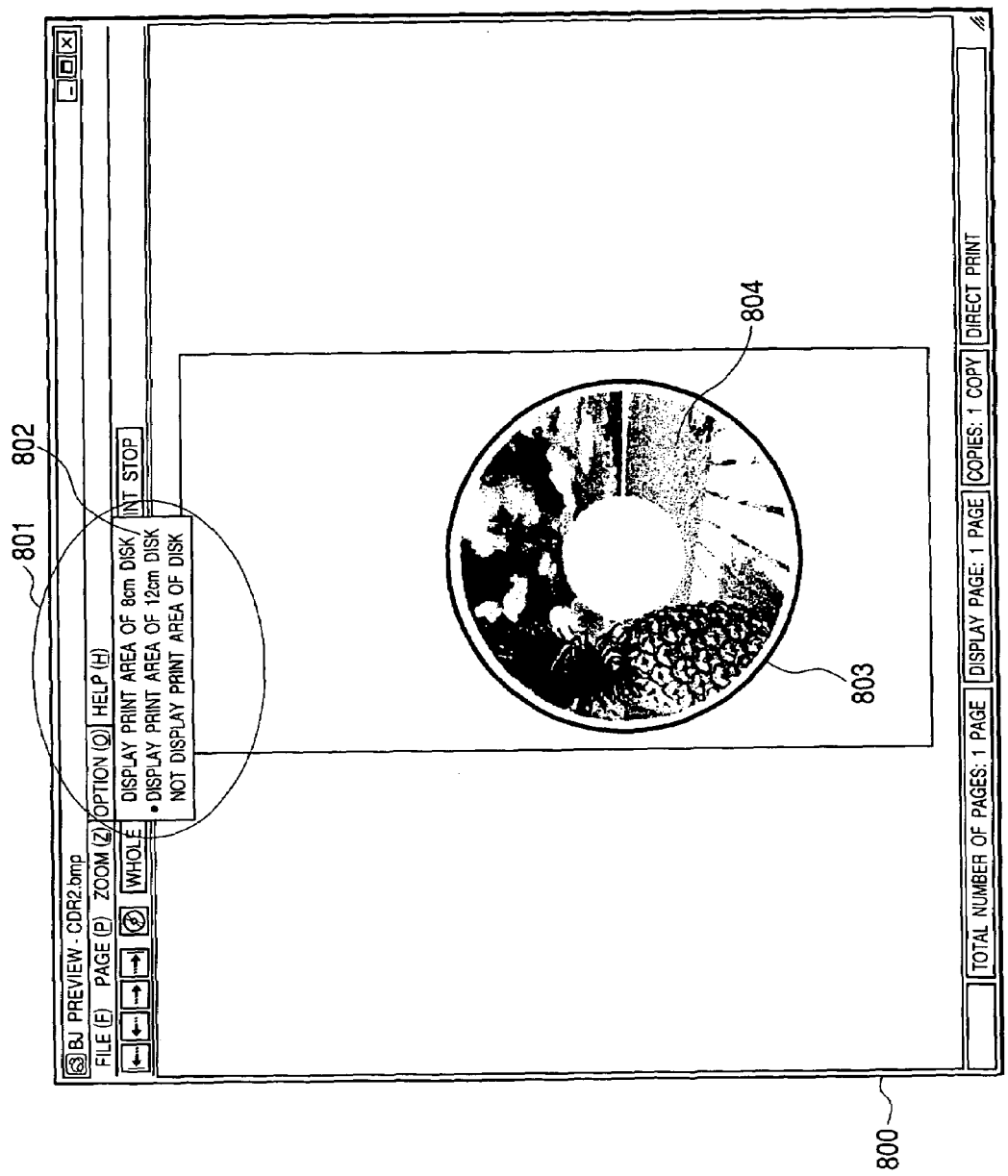
FIG. 8 is a diagram showing an example of a print preview display screen for a CD-R media of 12 cm which is displayed by the display apparatus in the case of print-outputting onto the CD-R media.

FIG. 8 is a diagram showing an example of a print preview display screen 800 for the CD-R media of 12 cm in the document formed by the application 201 in the case of print-outputting onto the CD-R media.

On the display screen 800 of FIG. 8, reference numeral "801" denotes the same item column as that of "701" in FIG. 7. As shown in FIG. 8, "802" is selected in the case of print-outputting onto the CD-R media and in the case of displaying the print preview for the CD-R media of 12 cm.

Reference numeral "803" denotes a range which would be actually outputted onto the CD-R media of 12 cm.

Reference numeral "804" denotes contents which would be actually outputted onto the CD-R media of 12 cm.

<Print Preview Display by the Previewer 208>

Figure 9:
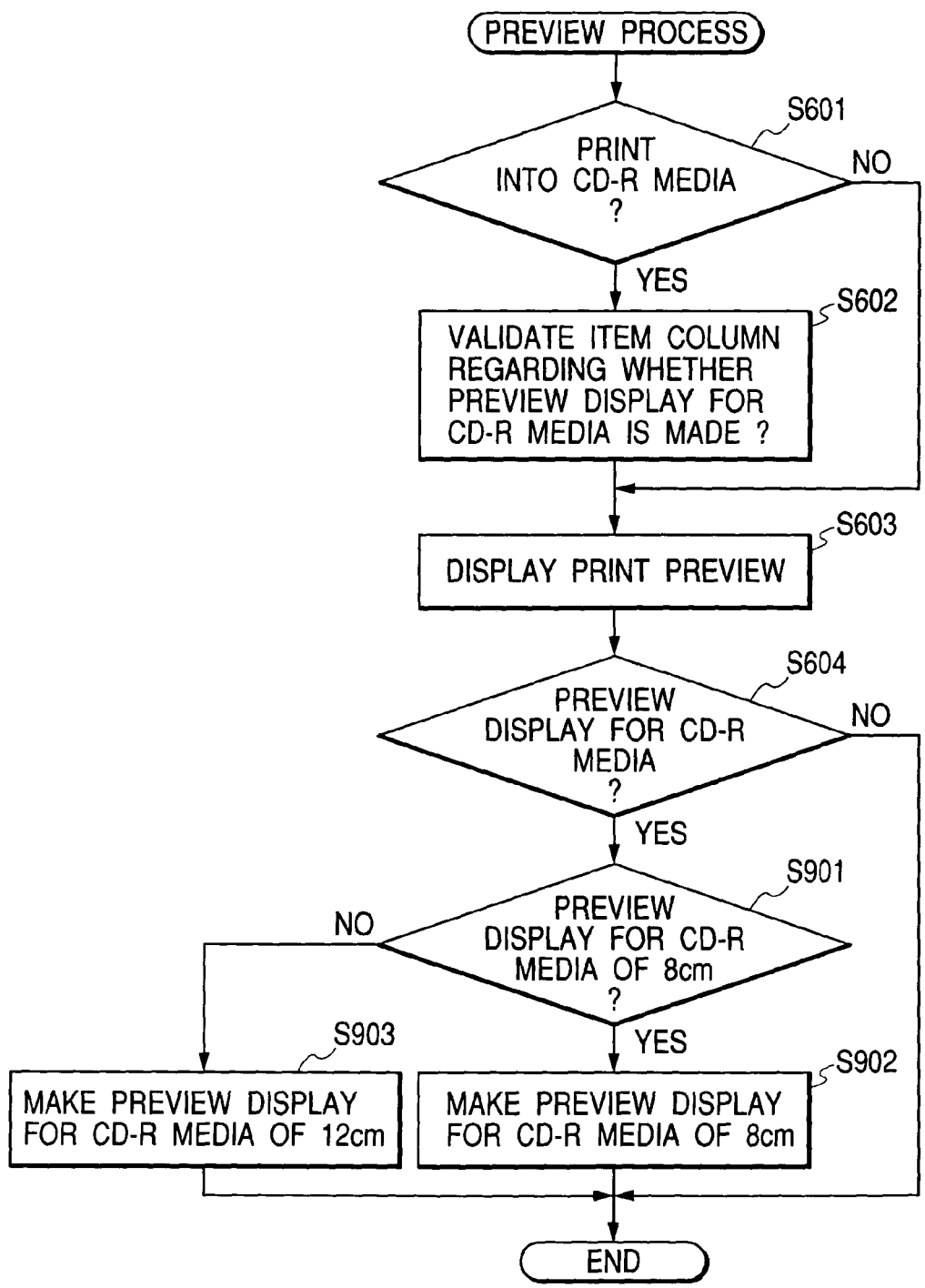
FIG. 9 is a flowchart showing the operation which is executed when a previewer displays a print preview according to the second embodiment of the invention.

FIG. 9 is a flowchart showing the operation which is executed when the previewer 208 displays the print preview according to the second embodiment.

In the diagram, processes similar to those in FIG. 6 shown in the first embodiment are designated by the same step numbers and their description is omitted here.

Now, attention is paid to a process in which the previewer 208 discriminates the displaying method of the display screens 700 to 800 shown in FIGS. 7 and 8.

Step S901:

The previewer 208 discriminates whether the image formed in the second mode is displayed as a print preview for the CD-R media of 8 cm or not from the state of the item column for allowing the user to select either the mode of displaying the print preview for the CD-R media of 8 cm or the mode of displaying the print preview for the CD-R media of 12 cm. As a result of the discrimination, if the print preview for the CD-R media of 8 cm is displayed, step S902 follows. If the print preview for the CD-R media of 8 cm is not displayed, that is, if the print preview for the CD-R media of 12 cm is displayed, step S903 follows.

Step S902:

As a result of the discrimination of step S901, if the print preview for the CD-R media of 8 cm is displayed, the previewer 208 displays the print preview for the CD-R media onto the display apparatus 104 and the state of the display screen 700 of FIG. 7 is obtained. The processing routine is finished.

Step S903:

As a result of the discrimination of step S901, if the print preview for the CD-R media of 12 cm is displayed, the previewer 208 displays the print preview for the CD-R media onto the display apparatus 104 and the state of the display screen 800 of FIG. 8 is obtained. The processing routine is finished.

(Third Embodiment)

The second embodiment is constructed in a manner such that when the previewer 208 displays the print preview for the CD-R media, by allowing the user to select either the mode of displaying the print preview for the CD-R media having the diameter of 8 cm is displayed or the mode of displaying the print preview for the CD-R media having the diameter of 12 cm is displayed, the range of the portion corresponding to the inside of the CD-R media and the range of the portion which is outputted to the CD-R media so as to overflow it can be switched.

The third embodiment is characterized in that when the previewer 208 displays the print preview for the CD-R media, whether the print preview for the CD-R media having the diameter of 8 cm is displayed or the print preview for the CD-R media having the diameter of 12 cm is displayed is discriminated on the basis of the size of CD-R media on the dedicated tray which is set in the printer 102 at present, thereby switching the range of the portion corresponding to the inside of the CD-R media and the range of the portion which is outputted to the CD-R media so as to overflow it.

Specifically speaking, when the print preview for the CD-R media is displayed, the previewer 208 inquires of the printer 102 about the size of CD-R media on the dedicated tray which is set in the printer 102 at present via the printer graphics driver 206 and an arbitrary data transmitting/receiving unit (not shown).

When the printer 102 receives the inquiry about the size from the previewer 208, the size of CD-R media on the dedicated tray which is set at present is automatically detected by a media size reading apparatus (not shown).

The printer 102 notifies the previewer 208 of the size automatically detected by the media size reading apparatus via the arbitrary data transmitting/receiving unit (not shown) and the printer graphics driver 206.

In accordance with the size notified by the printer 102, the previewer 208 displays the print preview for the CD-R media having the diameter of 8 cm or the print preview for the CD-R media having the diameter of 12 cm.

<Display of the Print Preview by the Previewer 208>

Figure 10:
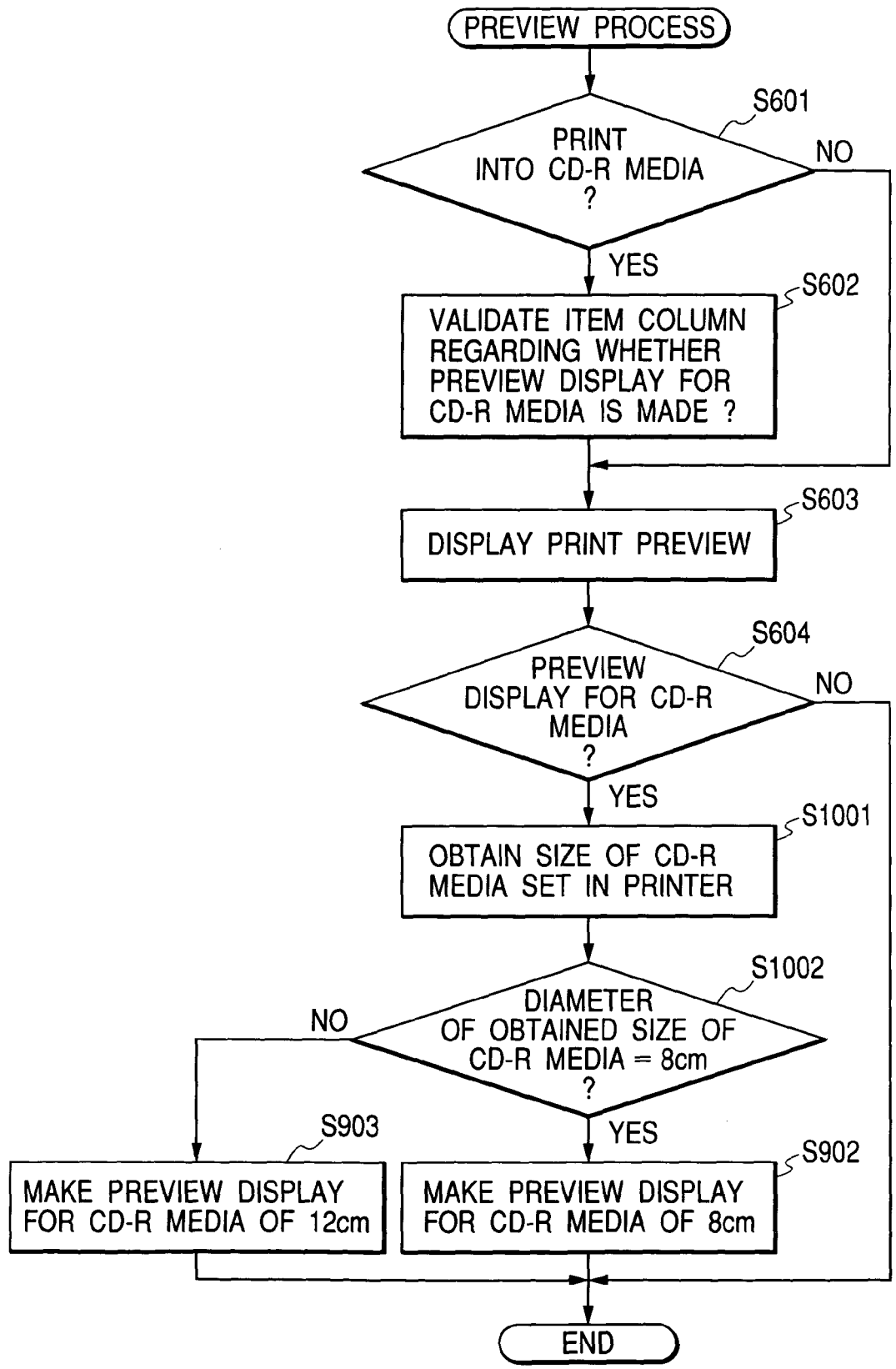
FIG. 10 is a flowchart showing the operation which is executed when a previewer displays a print preview according to the third embodiment of the invention.

FIG. 10 is a flowchart showing the operation which is executed when the previewer 208 displays the print preview in the third embodiment.

In the flowchart, processes similar to those in FIG. 9 shown in the second embodiment are designated by the same step numbers and their detailed description is omitted here.

Attention is paid to a process in which the previewer 208 discriminates the displaying method of the display screens 700 to 800 shown in FIGS. 7 and 8.

Step S1001:

The previewer 208 obtains the size of CD-R media on the dedicated tray which is set in the printer 102 at present from the printer 102.

Step S1002:

The previewer 208 discriminates whether the diameter of the size of CD-R media obtained in step S1001 is equal to 8 cm or not. As a result of the discrimination, if the diameter of the size of CD-R media is equal to 8 cm, step S902 follows. If the diameter of the size of CD-R media is not equal to 8 cm, step S903 follows.

(Fourth Embodiment)

In the first to third embodiments, the apparatus has been constructed in a manner such that, in the case of print-outputting to the CD-R media, the previewer 208 can discriminate the difference between the portion to be actually outputted onto the CD-R media, that is, the portion corresponding to the inside of the CD-R media and the portion which is outputted to the CD-R media so as to overflow it, that is, the portion corresponding to the outside of the CD-R media.

However, in the case of print-outputting to the CD-R media, it is generally desirable that the print data is arranged only to a portion coated by coating or working (hereinafter, such a portion is referred to as a label area) on a label surface of the CD-R media and print-outputted.

The fourth embodiment is, therefore, characterized in that in the case of print-outputting to the CD-R media, the size of CD-R media, a position of the label area, and a texture of the surface of the label area are discriminated on the basis of a model number stamp recorded in the center portion of the CD-R media on the dedicated tray which is set in the printer 102 at present, thereby enabling the previewer 208 to discriminate the difference between the portion corresponding to the inside of the label area and the portion corresponding to the outside of the label area or a difference between print results due to the texture of the surface of the label area.

Specifically speaking, in the case of displaying the print preview for the CD-R media, the previewer 208 inquires of the printer 102 about the. model number of the CD-R media on the dedicated tray which is set in the printer 102 at present via the printer graphics driver 206 and the arbitrary data transmitting/receiving unit (not shown).

When the printer 102 receives the inquiry about the model number from the previewer 208, the model number stamp recorded in the center portion of the CD-R media on the dedicated tray which is set at present is read by a model number stamp reading apparatus (not shown).

The printer 102 notifies the previewer 208 of the model number read by the model number stamp reading apparatus via the arbitrary data transmitting/receiving unit (not shown) and the printer graphics driver 206.

The previewer 208 displays the optimum print preview for the CD-R media with reference to a model number information table which has previously been held in the previewer by using the model number notified by the printer 102.

Figure 11:
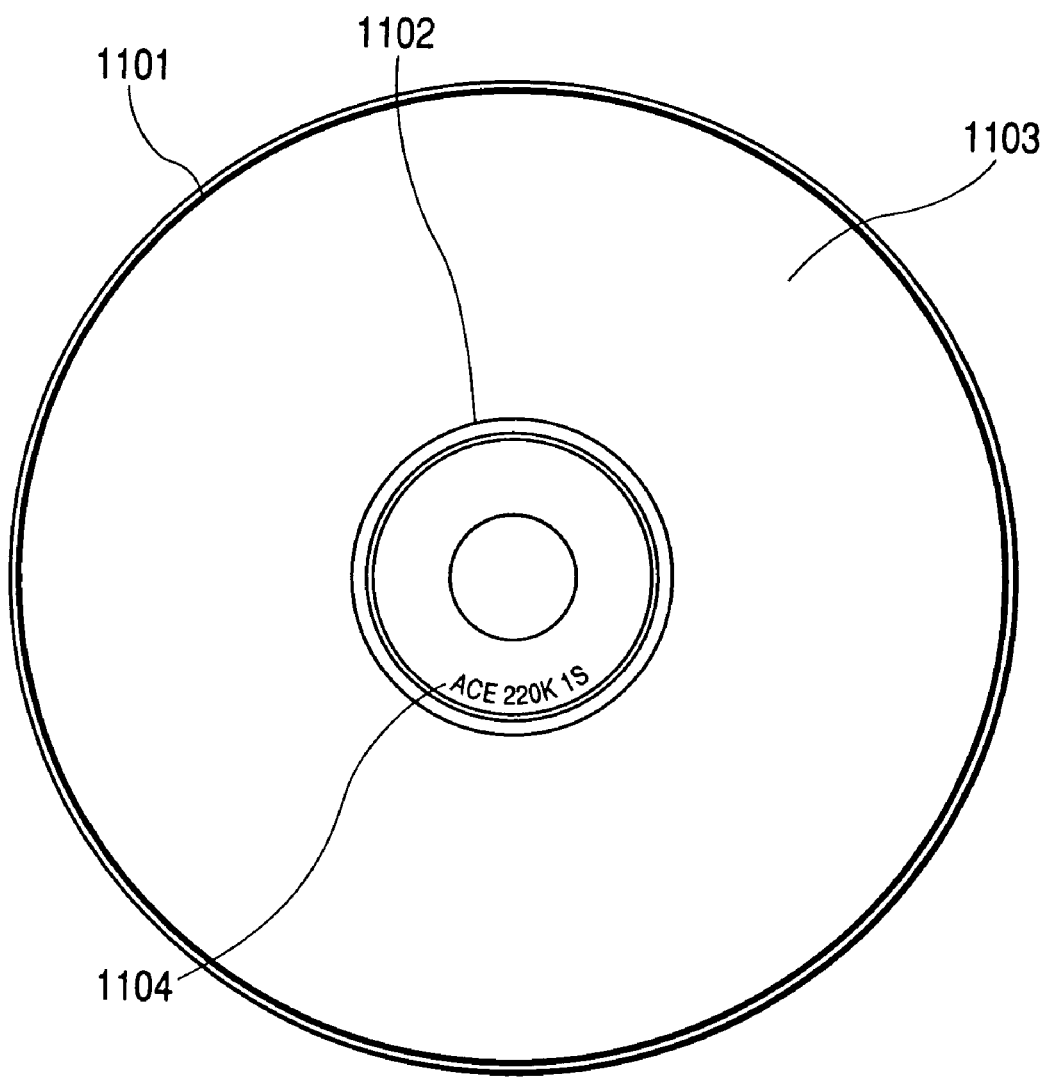
FIG. 11 is a diagram showing an example of a label surface of the CD-R media.

FIG. 11 is a diagram showing an example of the label surface of the CD-R media.

In FIG. 11, reference numeral "1101" denotes an outer boundary portion of the label area.

Reference numeral "1102" denotes an inner boundary portion of the label area.

Reference numeral "1103" denotes a label area.

Reference numeral "1104" denotes a model number stamp.

FIG. 12 is a diagram showing an example of the model number information table held in the previewer 208.

In FIG. 12, reference numeral "1201" denotes a model number of the CD-R media.

Reference numeral "1202" denotes a manufacturer of the CD-R media.

Reference numeral "1203" denotes a diameter of the CD-R media.

Reference numeral "1204" denotes a length from the center of the CD-R media to the outer boundary portion of the label area.

Reference numeral "1205" denotes a length from the center of the CD-R media to the inner boundary portion of the label area.

Reference numeral "1206" denotes a texture of the surface of the CD-R media of the CD-R media.

Reference numeral "1207" denotes a printing method in the case of printing into the label area of the CD-R media.

Figure 13:
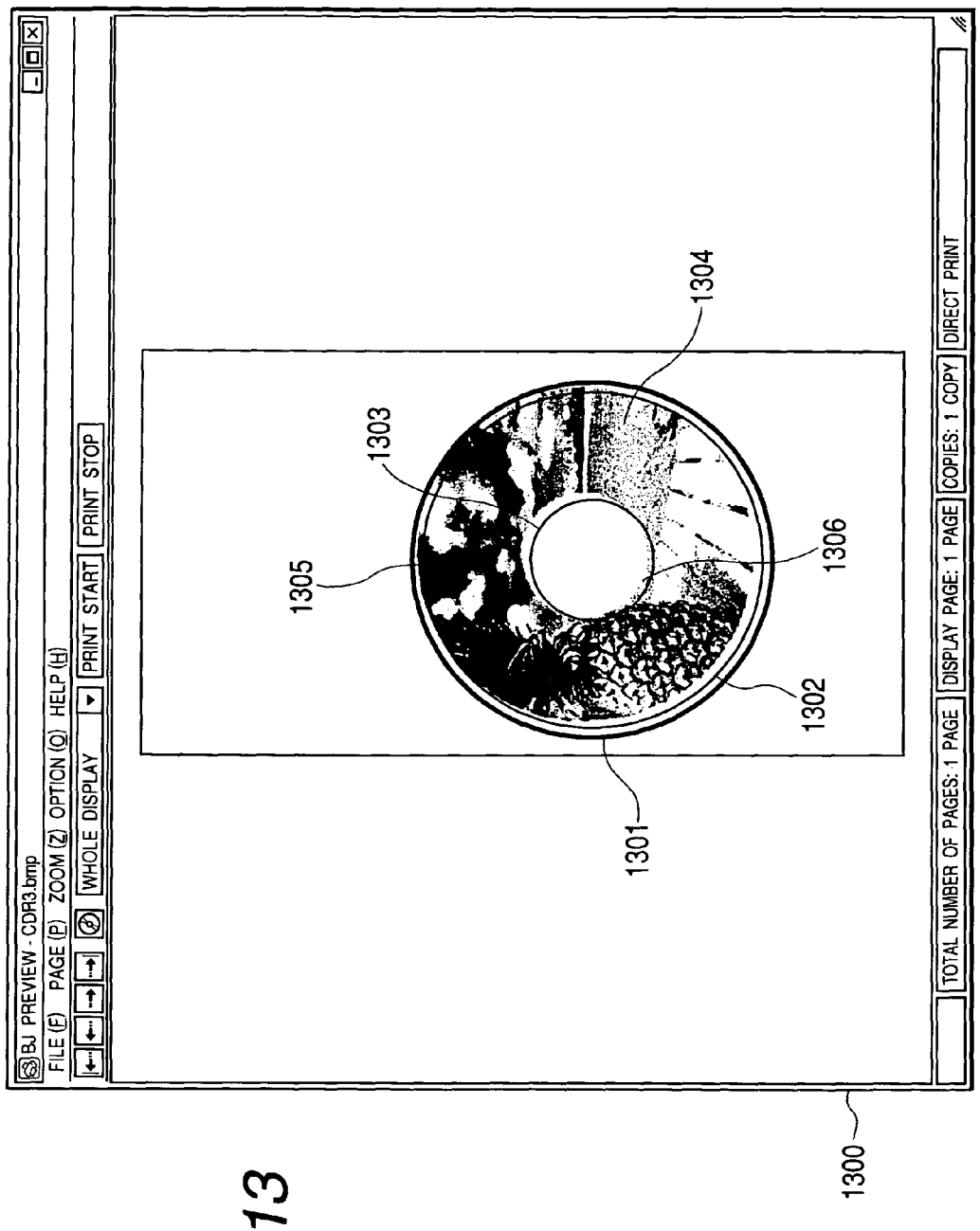
FIG. 13 is a diagram showing an example of a print preview display screen for a CD-R media which is displayed by the display apparatus in accordance with model number information in the case of print-outputting onto the CD-R media.

FIG. 13 is a diagram showing an example of a display screen 1300 of the print preview for the CD-R media in the document formed by the application 201 in the case of print-outputting onto the CD-R media of the model number shown at "1201" in FIG. 12.

In FIG. 13, reference numeral "1301" denotes an external shape of the CD-R media.

Reference numeral "1302" denotes an outer boundary portion of the label area of the CD-R media.

Reference numeral "1303" denotes an inner boundary portion of the label area of the CD-R media.

Reference numeral "1304" denotes contents which would be actually outputted into the label area of the CD-R media.

Reference numeral "1305" denotes contents which would actually be outputted so as to overflow the label area of the CD-R media into the outside thereof.

Reference numeral "1306" denotes contents which would actually be outputted so as to overflow the label area of the CD-R media into the inside thereof.

<Display of the Print Preview by the Previewer 208>

Figure 14:
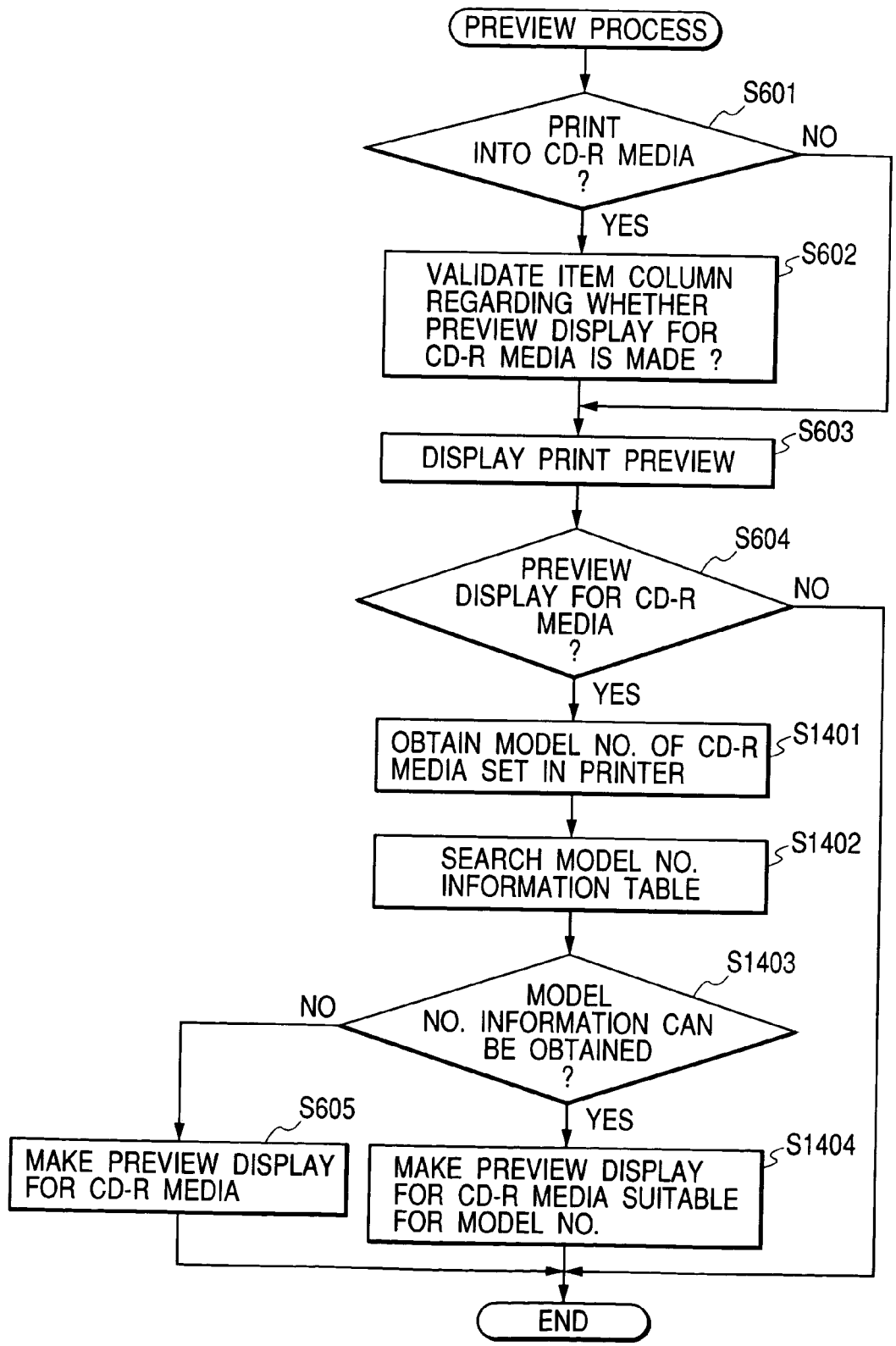
FIG. 14 is a flowchart showing the operation which is executed when a previewer displays a print preview according to the fourth embodiment of the invention.

FIG. 14 is a flowchart showing the operation which is executed when the previewer 208 displays the print preview in the fourth embodiment.

In the flowchart, processes similar to those in FIG. 6 shown in the first embodiment are designated by the same step numbers and their detailed description is omitted here.

Attention is paid to a process in which the previewer 208 discriminates the displaying method of the display screen 1300 shown in FIG. 13.

Step S1401:

The previewer 208 obtains the model number of the CD-R media on the dedicated tray which is set in the printer 102 at present from the printer 102.

Step S1402:

The previewer 208 searches model number information suitable for the model number of the CD-R media obtained in step S1401 from the model number information table shown in FIG. 12.

Step S1403:

Whether the model number information could be obtained by the process in step S1402 or not is discriminated. As a result of the discrimination, if the model number information cannot be obtained, step S605 follows. If the model number information could be obtained, step S1404 follows.

Step S1404:

The previewer 208 displays the print preview for the CD-R media suitable for the model number information obtained by the process in step S1402 onto the display apparatus 104, so that the state of the display screen 1300 in FIG. 13 is obtained. The present processing routine is finished.

Figure 15:
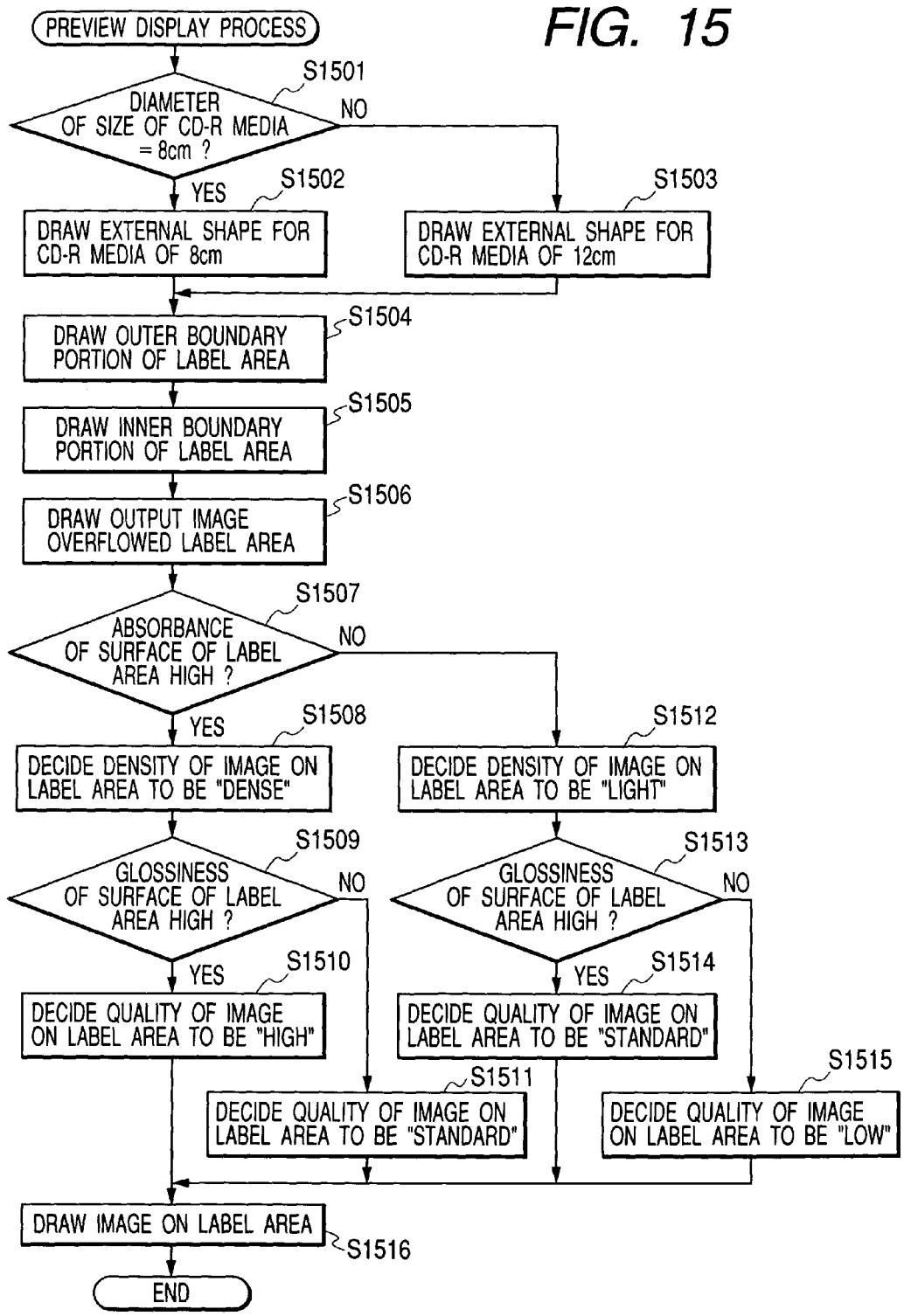
FIG. 15 is a flowchart showing the operation which is executed when the print preview for a CD-R media suitable for the model number information in the operation which is executed when the previewer displays the print preview according to the fourth embodiment of the invention.

FIG. 15 specifically shows the process in step S1404 in the print preview displaying process shown in FIG. 14.

Step S1501:

The previewer 208 discriminates whether the diameter of the size of CD-R media obtained from the model number information table is equal to 8 cm or not. As a result of the discrimination, if the diameter of the size of CD-R media is equal to 8 cm, step S1502 follows. If the diameter of the size of CD-R media is not equal to 8 cm, step S1503 follows.

Step S1502:

As a result of the discrimination in step S1501, if the diameter of the size of CD-R media is equal to 8 cm, the previewer 208 displays the external shape of the CD-R media of 8 cm onto the display apparatus 104.

Step S1503:

As a result of the discrimination in step S1501, if the diameter of the size of CD-R media is not equal to 8 cm, the previewer 208 displays the external shape of the CD-R media of 12 cm onto the display apparatus 104.

Step S1504:

The previewer 208 displays the outer boundary portion of the label area in accordance with the length from the center of the CD-R media to the outer boundary portion of the label area obtained from the model number information table onto the display apparatus 104.

Step S1505:

The previewer 208 displays the inner boundary portion of the label area in accordance with the length from the center of the CD-R media to the inner boundary portion of the label area obtained from the model number information table onto the display apparatus 104.

Step S1506:

The previewer 208 displays the image of the portion which is outputted so as to overflow the label area of the CD-R media into the outside or the inside thereof by the display apparatus 104.

Step S1507:

The previewer 208 discriminates whether absorbance of the surface of the label area obtained from the model number information table is high or not. As a result of the discrimination, if the absorbance of the surface of the label area is high, step S1508 follows. If the absorbance of the surface of the label area is not high, step S1512 follows.

Step S1508:

The previewer 208 determines density of the image of the portion which is outputted into the label area of the CD-R media to be "dense".

Step S1509:

The previewer 208 discriminates whether glossiness of the surface of the label area obtained from the model number information table is high or not. As a result of the discrimination, if the glossiness of the surface of the label area is high, step S1510 follows. If the glossiness of the surface of the label area is not high, step S1511 follows.

Step S1510:

The previewer 208 determines quality of the image of the portion which is outputted into the label area of the CD-R media to be "high quality".

Step S1511:

The previewer 208 determines the quality of the image of the portion which is outputted into the label area of the CD-R media to be "standard quality".

Step S1512:

The previewer 208 determines the density of the image of the portion which is outputted into the label area of the CD-R media to be "light".

Step S1513:

The previewer 208 discriminates whether the glossiness of the surface of the label area obtained from the model number information table is high or not. As a result of the discrimination, if the glossiness of the surface of the label area is high, step S1514 follows. If the glossiness of the surface of the label area is not high, step S1515 follows.

Step S1514:

The previewer 208 determines the quality of the image of the portion which is outputted into the label area of the CD-R media to be "standard quality".

Step S1515:

The previewer 208 determines the quality of the image of the portion which is outputted into the label area of the CD-R media to be "low quality".

Step S1516:

The previewer 208 converts the image of the portion which is outputted into the label area of the CD-R media in accordance with the density and the quality which were determined as mentioned above and displays it onto the display apparatus 104.

The media which can be applied to the embodiment is not limited to the CD-R but it is possible to use an arbitrary media such as DVD, CD-ROM, or the like which is not formatted by the general application. In other words, when a special type of media which is not formatted by the general application is set, it is sufficient to read out and recognize information showing a preset printable area of the special media and display a frame of the printable area onto the preview image so that it can be discriminated.

Although the boundary between the portion corresponding to the inside of the CD-R and the portion corresponding to the outside is shown by the line in the foregoing embodiment, it is sufficient to display the portion corresponding to the inside and the portion corresponding to the outside so that they can be discriminated by the user. For example, there is a method of displaying both areas in different colors such as method of changing density, brightness, or the like of the areas, or the like. If data arranged in an unprintable area is printed as it is, the printer prints on the outside of the media. Therefore, the user's attention is aroused by such a method. The user can see the preview image, change the layout of the image, confirm by the preview image again, and print.

In the second embodiment, whether the print preview for the CD-R media having the diameter of 8 cm is displayed or the print preview for the CD-R media having the diameter of 12 cm is displayed is selected by the previewer. However, they can be also selected by the user interface driver.

In the fourth embodiment, the previewer converts the preview image in accordance with the texture of the surface of the label area of the CD-R. However, the preview image can be also formed in accordance with the texture of the surface of the label area of the CD-R when the printer graphics driver forms the preview image data.

As described above, in the embodiments, when the print preview of the print data is displayed before the print data such as a document or the like is actually print-outputted onto the sheet, in the case of print-outputting onto the CD-R media, not only the contents which would be outputted onto the sheet selected by the application are displayed but also the portion which is actually outputted onto the CD-R media and the portion which is outputted to the CD-R media so as to overflow it are displayed so that the difference between those portions can be visually discriminated.

According to the foregoing construction, in the case of print-outputting onto the CD-R media, the user can accurately confirm the contents which would be outputted onto the CD-R media. Therefore, it is possible to prevent that the dedicated tray which is set into the printer is dirtied. The print preview function of better use convenience can be provided.

The invention is not always limited to the embodiments but can be embodied in various forms.

Naturally, the object of the invention is also accomplished by a method whereby a memory medium in which program codes of software for realizing the functions of the host and the terminals of the embodiments have been stored is supplied to a system or an apparatus and a computer (or a CPU or an MPU) of the system or the apparatus reads out the program codes stored in the memory medium and executes them.

In this case, the program codes read out from the memory medium realize the functions of the embodiments and the memory medium in which the program codes have been stored and the program codes construct the invention.

As a memory medium to supply the program codes, a ROM, a flexible disk, a hard disk, an optical disk, a magnetooptic disk, a CD-ROM, a CD-R, a magnetic tape, a non-volatile memory card, or the like can be used.

Naturally, the invention incorporates not only a case where a computer executes the read-out program codes, so that the functions of the embodiments are realized but also a case where an OS or the like which is operating on the computer executes a part or all of actual processes on the basis of instructions of the program codes and the functions of the embodiments are realized by those processes.

Further, the invention incorporates a case where the program codes read out from the memory medium are written into a memory provided for a function expanding board inserted in a computer or a function expanding unit connected to a computer and, thereafter, a CPU or the like provided for the function expanding board or the function expanding unit executes a part or all of actual processes on the basis of instructions of the program codes and the functions of the embodiments are realized by those processes.

According to the embodiments, when the image is formed to the recording medium such as a CD-R or the like, control is made so as to display the image onto the recording medium so that the portion corresponding to the inside and the portion corresponding to the outside can be discriminated. Thus, the image which is printed onto the recording medium so as to overflow it can be previously grasped and the preview function of better use convenience can be provided.

What is claimed is:

1. An image processing method which is used to confirm a layout of an image which is to be formed onto a first recording medium on the basis of an application, the first recording medium being of a disk shape and set in a dedicated tray of a printer, said method comprising:
    a forming step of forming the image based on said application;
    a first displaying step of displaying an external shape of the first recording medium based on a diameter of the first recording medium;
    a second displaying step of displaying outer and inner boundaries, defining a label area therebetween inside the displayed external shape; and
    a third displaying step of displaying the image so that a portion of the formed image corresponding to the label area and a portion of the image corresponding to an area which would overflow the label area can be discriminated,
    wherein the label area is suitable for printing on the first recording medium.

2. A method according to claim 1, further comprising a discriminating step of discriminating, by a discriminating unit, whether a first mode of forming the image onto the first recording medium has been set or a second mode of forming the image onto a second recording medium having a shape mismatched with the dedicated tray has been set,
    wherein, if it is determined in said discriminating step that the first mode has been set, said display control step is executed.

3. A method according to claim 2, further comprising a selecting step of selecting, by a selecting unit, whether said first displaying step, said second displaying step and said third displaying step are executed or not,
    wherein, if it is determined in said discriminating step that said second mode has been set and if it is selected in said selecting step that said first displaying step, said second displaying step and said third displaying step are executed, said first displaying step, said second displaying step and said third displaying step are executed.

4. A method according to claim 1, further comprising recognizing a type of the first recording medium,
    wherein said second displaying step determines and displays the outer and inner boundaries in accordance with the recognized type of the first recording medium.

5. A method according to claim 4, wherein said second displaying step determines and displays the outer and inner boundaries such that the boundaries vary for respective types, even if the external shape based on the diameter of the first recording medium is constant.

6. A method according to claim 1, wherein said image processing method is a method which is used to display a print preview of print data formed by an arbitrary application before the print data is print-processed, and in said display control step, in the case of print-outputting the print data onto the first recording medium including a CD or a DVD, a process for displaying the image so that a difference between a portion which is printed onto the first recording medium and a portion which would ovefflow the first recording medium can be visually discriminated.

7. An image processing apparatus comprising:

an image forming unit configured to form an image which is to be formed onto a first recording medium on the basis of an application, the first recording medium being of a disk shape and set in a dedicated tray of a printer; and a display control unit configured to display an external shape of the first recording medium based on a diameter of the first recording medium and to display outer and inner boundaries, defining a label area therebetween inside the external shape, wherein said display control unit is configured to display the image so that a portion of the image formed by said image forming unit corresponding to the label area and a portion of the image corresponding an area which would overflow the label area can be discriminated, wherein the label area is suitable for printing on the first recording medium.

8. An apparatus according to claim 7, further comprising a discriminating unit configured to discriminate whether a first mode of forming the image onto the first recording medium has been set or a second mode of forming the image onto a second recording medium having a shape mismatched with the dedicated tray has been set, wherein, if it is determined by said discriminating init that the first mode has been set, said display control unit controls the displaying process.

9. An apparatus according to claim 8, further comprising a selecting unit configured to select whether said display control unit is made operative or not, wherein, if it is determined by said discriminating unit that the first mode has been set and if it is selected by said selecting unit that said display control unit is made operative, said display control unit controls the displaying process.

10. An apparatus according to claim 7, further comprising a recognizing unit configured to recognize a type of the first recording medium, wherein said second displaying unit determines and displays the outer and inner boundaries in accordance with the type of the first recording medium recognized by said recognizing unit.

11. An apparatus according to claim 10, wherein said second displaying unit determines and displays the outer and inner boundaries such that the boundaries vary for respective types, even if the external shape based on the diameter of the first recording medium is constant.

12. An apparatus according to claim 7, wherein before print data formed by an arbitrary application is print-processed, said display control unit controls a process for displaying a print preview of the print data, and in the case of print-outputting the print data onto the first recording medium including a CD or a DVD, said display control unit controls a process for displaying the image so that a difference between a portion which is printed onto the first recording medium and a portion which would overflow the first recording medium can be visually discriminated.

13. A computer-readable memory medium which stores a program for allowing a computer to execute an image processing method which is used to confirm a layout of an image which is to be formed onto a first recording medium on the basis of an application, the first recording medium being of a disk shape and set in a dedicated tray of a printer, wherein said program comprises:

a forming step of forming the image based on said application;

a first displaying step of displaying an external shape of the first recording medium based on a diameter of the first recording medium;

a second displaying step of displaying outer and inner boundaries, defining a label area therebetween inside the displayed external shape; and a third displaying step of displaying the image so that a portion of the formed image corresponding to the label area and a portion of the image corresponding to an area which would overflow the label area can be discriminated, wherein the label area is suitable for printing on the first recording medium.

* * * * *